Aug. 18, 1964         A. G. SANDISON         3,145,165
                        PULP SCREENS
Filed Oct. 23, 1961                      2 Sheets-Sheet 2

INVENTOR.
Alexander G. Sandison.

United States Patent Office 3,145,165
Patented Aug. 18, 1964

3,145,165
PULP SCREENS
Alexander Greswolde Sandison, 546 14th St. W.,
Owen Sound, Ontario, Canada
Filed Oct. 23, 1961, Ser. No. 146,987
8 Claims. (Cl. 209—254)

This invention relates to pulp screens of the type used for the fine screening of paper stock, such screening being carried out with the stock at a very dilute consistency so that it flows freely.

Two types of screen that have hitherto been employed are the centrifugal type and the vane type. In the centrifugal type the stock is impelled under the action of a power driven impeller at a relatively high velocity around the inside of a screen element, usually of cylindrical form, and the chief action for preventing the perforations of the screen element from becoming blocked is the scouring effect of the stock sweeping over the screen element. In the vane type of screen the velocity of the stock is usually relatively low and the screen perforations are maintained clear by the pulsating effect produced by a vane, or series of vanes, generally of streamlined form, sweeping through the stock adjacent to the screen element under the action of a power drive. In practice it is found that the vane type of screen is the more efficient for maintaining the screen perforations clear and for obtaining a high output per unit area of screen element, but is inferior to the centrifugal type in allowing a greater proportion of the coarser fibre in the stock to pass through screen perforations of a given size. The deduction to be drawn is that while the strong pulsating effect provided by the passage of vanes close to the screen element is in general highly beneficial to efficient operation it may also be deleterious to the quality of screening unless the stock is maintained at reasonably high velocity along the surface of the screen element during the entire pulsation cycle produced by the passage of a vane.

It will be understood that in a screen of the vane type the production of pressure and suction effects such as will produce pulsating changes of pressure of the stock against the screen element depends on relative movement between vane and stock, and that no such effects are produced if the vanes move at the same speed as the stock. In screens of vane type it has been usual to arrange for the vanes to move forward through stock which is impelled by the action of the vanes to move in the same direction but at a lower speed than the latter. Under these conditions the passage of a vane causes temporarily reduced or reversed flow velocity along the surface of the screen element, presenting a greater opportunity for coarse fibre to pass through the perforations of the screen element than would be the case if the scouring effect of unidirectional high velocity were maintained at all times during the pulsation cycles.

In the present invention the stock is caused to flow over the surface of a screen element at relatively high velocity, and vanes mounted for movement in the stock and adjacent to the screen element are constrained to move in the same direction as the stock but at a lower velocity. The moving stock is thus in the position of overtaking the vanes, and if the vanes are suitably streamlined the stock passes between each vane and the screen with increased velocity in the same direction as before, while at the same time a suction effect is produced by Venturi type action, so that any given point on the screen element is subjected to a pulsation of reduced pressure at each passage of a vane, and these pulsations assist in keeping the screen perforations from becoming blocked. As it is desirable that the unscreened stock shall maintain an adequate overtaking velocity throughout its travel, despite the resistance offered by the vanes, the vanes should be proportioned so as to offer low resistance to the flow of unscreened stock, as may be accomplished by making them moderate in size, low in number, and streamlined in section.

It will be understood that while considerable external pumping power is in general necessary to deliver the stock to the screen at a pressure great enough to produce a sufficiently high inlet velocity, no power is necessary to drive the vanes which must, in fact, be restrained by braking or similar means from acquiring a velocity approaching that of the stock.

In the preferred form of the invention the screen element is of the shape of a surface of revolution, and rapid vortical flow within the screen element is obtained by admitting the stock under relatively high pressure through a tangential inlet, and the vanes are mounted for free rotation adjacent to the screen element but are provided with braking means to hold their speed below that of the stock. The braking means preferably consists of a distributing means for dilution water rotating with the vanes, so that the torque required by the distributing means as the dilution water flows through it acts as a braking torque on the vanes. With this arrangement no power drive is required for the equipment.

The invention is exemplified in the accompanying drawings wherein.

Figure 1:
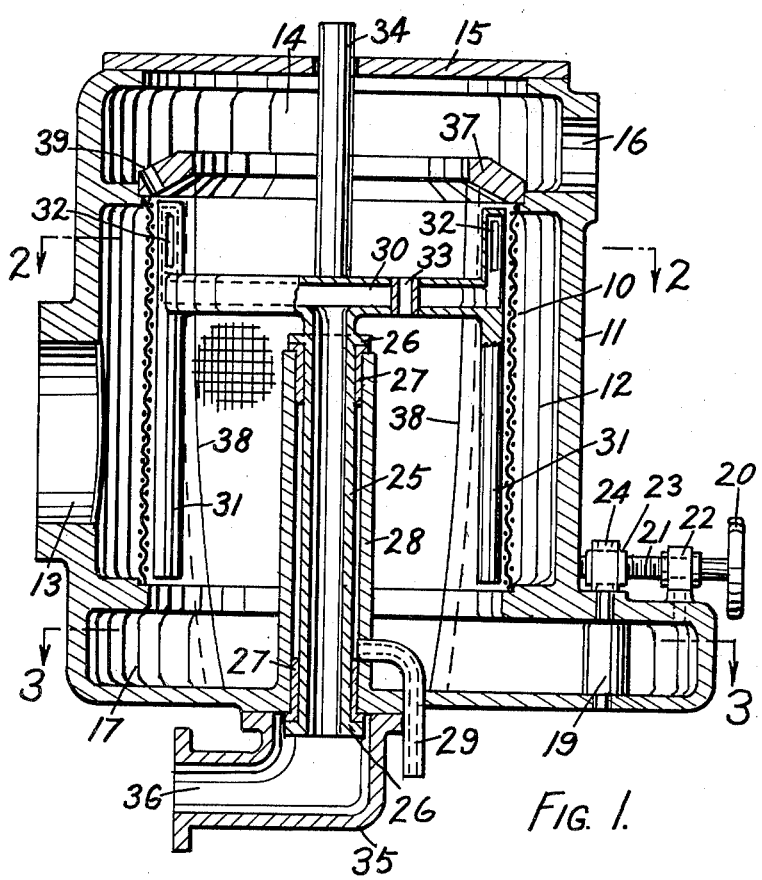
FIG. 1 is a side elevation, chiefly in section.
Figure 2:
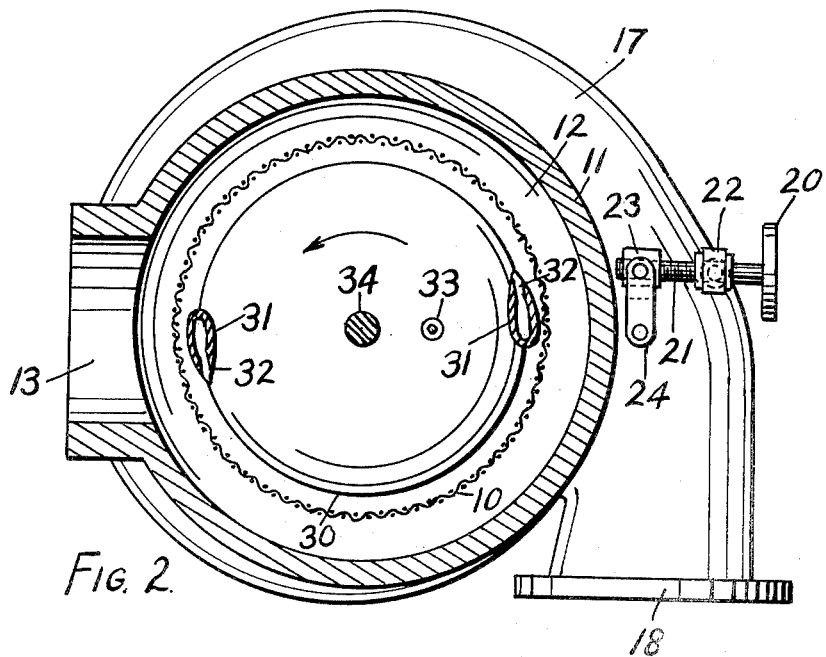
FIG. 2 is a sectional plan view on the line 2—2 of FIG. 1.
Figure 3:
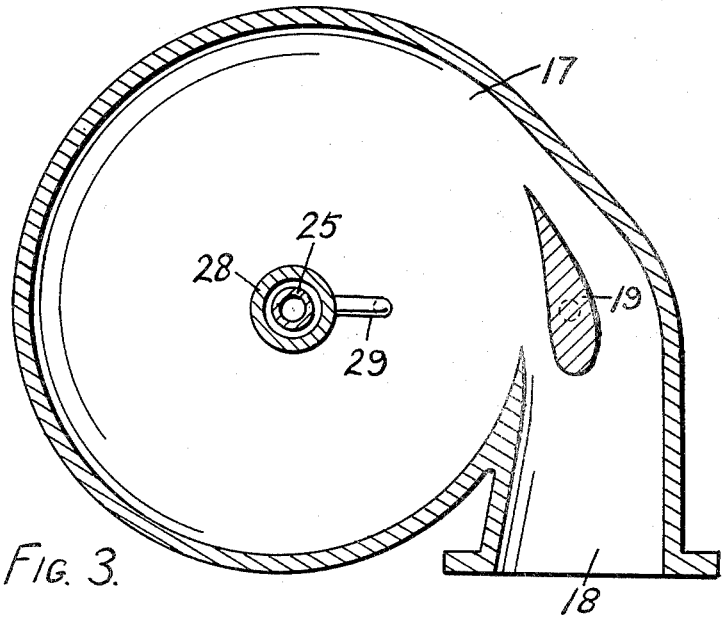
FIG. 3 is a sectional plan view on the line 3—3 of FIG. 1.

Referring to the drawings, a screen element 10 of the form of a surface of revolution is mounted within a casing 11 so as to leave a chamber 12 external to the screen element 10 and leading to an outlet 13. The interior of the screen element 10 connects at its upper end to a space 14 which is closed by a cover plate 15 and leads to an outlet 16, and at its lower end to a scroll 17 provided with an inlet 18 and regulating gate 19, the shape and arrangement of the inlet gate 19 and its associated passages being such as to promote substantially tangential flow of stock into the scroll 17. The gate 9 is pivotally mounted and is provided with means for adjustment comprising a handwheel 20, screw 21, pivotally mounted bearing 22, pivotally mounted nut 23 and arm 24. A hollow shaft 25, provided with thrust collars 26, is rotatably mounted in bushings 27, preferably made of non-metallic material, held in a central housing 28 to which is connected a pipe 29 for the supply of clean water for purposes of lubrication. A hollow disc 30 is mounted on shaft 25 and its interior connects with that of the shaft. Vanes 31 are attached to disc 30 in such position that their path of movement is adjacent to the screen element 10, and at least the top portion of the vanes is hollow, their interior communicating with that of the disc 30. Orifices 32 provided in the vanes are directed in the same direction as the vortical swirl induced by stock entering under pressure through the passages adjacent to the gate 19. The cross-section of the vanes is preferably of streamline form, with the blunter end of the section located in opposition to the direction of the vortical swirl. A tube 33 extending through disc 30 serves as an equaliser of air pressure between the sections above and below the disc. A tail shaft 34 secured to disc 30 extends through the cover 15. A housing 35 provided with an inlet 36 surrounds the lower end of the hollow shaft 25. A ring 37 of internal diameter less than that of the screen element 10 and located above the screen element serves to increase the depth of the vortex of stock against the screen element, so that the free surface of the vortex will assume a position approximately as indicated by the lines 38. A relatively small hole 39 is located in ring 37 adjacent to the screen element 10.

In operation, unscreened stock at a suitably high pressure is admitted at the inlet 18 and issues with tangential velocity through the passages adjacent to the gate 19 and through the scroll 17 to form the vortex whose free surface is indicated by the lines 38. The rate of flow of the stock can be controlled by adjusting the angular position of the gate by means of the handwheel 20 and its associated mechanism. At the same time dilution water is admitted through inlet 36 and housing 35 to the rotatably mounted assembly comprising shaft 25, disc 30 and vanes 31 to emerge as jets through the orifices 32 in the same direction of movement as the vortical swirl. The rotatably mounted assembly thus has a function as a distributor of dilution water.

It will be understood that if no dilution water were admitted to the distributor, and neglecting the effects of bearing friction, the vanes would assume a rotational velocity substantially equal to that of the vortex so that there would be little relative velocity between vanes and stock. In this condition the passage of a vane would produce little pressure change at the surface of the screen element so that no useful pulsation of pressure can be achieved. However, when dilution water is admitted under pressure at inlet 36 to emerge as jets through the orifices 32, the jet reaction will exert a torque on the rotating assembly, thus slowing it down to the condition where the drag of the vanes in the vortex is sufficient to balance the torque due to the jet reaction. A good operating condition is when the rotational velocity of the rotating assembly is about half that of the vortex, and such a condition can be obtained by suitably regulating the supply of dilution water. The emergent end of tail shaft 34 allows the speed of rotation to be observed. Under the operating condition outlined there is relative movement between the stock and the vanes, the stock overtaking the vanes to flow past them, and as the space between each vane and the screen element is of the nature of a venturi passage the stock passes between each vane and the screen element at increased velocity and reduced pressure. Thus at any point on the screen element there is a temporary reduction of pressure and an increase in stock velocity as each vane passes so that an effective pressure pulsation is produced, and while the velocity of flow of stock across the surface of the screen element may be temporarily increased during a portion of each pulsation cycle this velocity is not reversed or reduced substantially below the velocity of the vortical swirl during any part of the cycle. While the drag of the vanes tends to decelerate the vortical motion of the stock this effect is substantially balanced by the action of the jets of dilution water which help to sustain this motion.

The main flow of stock passes with the accepted fibre through the screen element 10 and out through chamber 12 and outlet 13. The oversize fibre which does not pass through the screen plate is first carried upward into the space above the disc 30 by the flow of the remaining stock and is there diluted by the dilution water issuing from the orifices 32. The finally rejected fibre is discharged as a suspension of tailings chiefly over the inner rim of the ring 37 into the space 14 and through outlet 16. The passage of heavy tramp material, such as might otherwise be unable to leave the screen owing to the effects of centrifugal force, is facilitated by the hole 39, which, however, should not be large enough to accommodate more than a small proportion of the flow of tailings.

What I claim as my invention is:

1. A pulp screen comprising a casing, a screen element mounted in the casing, means for distributing unscreened stock at high velocity along one side of the screen element, a system of vanes mounted for movement in the unscreened stock adjacent to the screen element, restraining means acting on the system of vanes, an outlet for stock that has passed through the screen element, and an outlet for stock that has failed to pass through the screen element; said system of vanes being driven only by the drag exerted by the high velocity flow of unscreened stock but restrained by said restraining means for acquiring a velocity as high as that of the stock, each vane being shaped and located to define between itself and the screen element a clearance passage of the shape of a venturi passage having a smoothly converging end and a slowly diverging end, the slowly diverging end being defined by the portion of the blade that leads in respect of its direction of travel.

2. A pulp screen, as claimed in claim 1, wherein each vane is of streamlined form having a blunt and a tapered edge, and so disposed that the tapered edge is the leading edge in respect of the direction of travel of the vane.

3. In a pulp screen, the combination of a screen element, means for directing unscreened stock at high velocity along the surface of the screen element, and means for producing pulsations of pressure on the surface of the screen element; said means for producing pulsations comprising a system of vanes mounted for movement adjacent to the surface of the screen element; each vane being shaped and located to define between itself and the screen element a clearance passage of the shape of a venturi passage having a smoothly converging end and a slowly diverging end, the slowly diverging end being defined by the portion of the blade that leads in respect of its direction of travel; said system of vanes being driven only by the drag exerted by the flow of stock but provided with restraining means whereby the vanes are restrained from acquiring a velocity as high as that of the unscreened stock, so that the stock flows through the passages between vanes and screen element with local increase of velocity, thereby causing local diminution of pressure while maintaining unidirectional flow.

4. In a pulp screen, the combination of a screen element shaped as a surface of revolution, means for admitting unscreened stock in vortical flow on one side of the screen element, a rotatably mounted system of vanes adapted for movement in the unscreened stock adjacent to the screen element, and braking means acting on the rotatably mounted system; said system of vanes being rotated only by the drag exerted by the vortical flow of stock but restrained by the braking means from acquiring a rotational speed as great as that of the vortical flow; each vane being shaped and located to define between itself and the screen element a clearance passage of the shape of a venturi passage having a smoothly converging end and a slowly diverging end, the slowly diverging end being defined by the portion of the blade that leads in respect of its direction of travel.

5. A pulp screen comprising a casing, a screen element of the form of a surface of revolution mounted within the casing, means for admitting unscreened stock in vortical flow onto the inner side of the screen element, an outlet for stock that has passed through the screen element, an outlet for stock that has failed to pass through the screen element, a system of vanes mounted for free rotation and adapted for movement in the unscreened stock adjacent to the screen element, and distributing means for dilution water mounted on the system of vanes so that the torque required for operation of the distributing means acts as a braking torque on the rotatably mounted system thereby restraining it from acquiring a rotational speed as great as that of the vortical flow; each vane being shaped and located to define a passage between itself and the screen element a clearance passage of the shape of a venturi passage having a smoothly converging end and a slowly diverging end, the slowly diverging end being defined by the portion of the blade that leads in respect of its direction of travel.

6. A pulp screen, as claimed in claim 5, wherein the distributing means are shaped to direct the dilution water in the same direction as that of the vortical flow.

7. A pulp screen, as claimed in claim 5, wherein the means for admitting the unscreened stock comprise gate-controlled tangential passages.

8. A pulp screen, as claimed in claim 5, wherein a ring is located in the connection between the interior of the screen element and the outlet for stock that has failed to pass through the screen element, the ring being concentric with and extending inwardly from the screen element, thereby confining the unscreened stock in sufficient depth against the screen element to produce effective centrifugal head within the screen element.

References Cited in the file of this patent

UNITED STATES PATENTS

| | | |
|---|---|---|
| 568,821 | Waring | Oct. 6, 1896 |
| 1,551,953 | Haug | Sept. 1, 1925 |
| 1,832,560 | Kendig | Nov. 17, 1931 |
| 1,990,992 | Lang et al. | Feb. 12, 1935 |
| 1,993,214 | Hass | Mar. 5, 1935 |
| 2,347,716 | Staege | May 2, 1944 |
| 2,501,916 | Rantaniemi | Mar. 28, 1950 |
| 2,752,828 | Sandison | July 3, 1956 |
| 2,796,809 | Sprau | June 25, 1957 |
| 2,835,173 | Martindale | May 20, 1958 |
| 2,908,390 | Rich | Oct. 13, 1959 |
| 2,975,899 | Cannon et al. | Mar. 21, 1961 |
| 3,053,391 | Nelson | Sept. 11, 1962 |

FOREIGN PATENTS

| | | |
|---|---|---|
| 599,616 | Germany | Nov. 15, 1932 |